United States Patent [19]

Davis et al.

[11] 4,453,783

[45] Jun. 12, 1984

[54] BEARING SUPPORT STRUCTURE

[75] Inventors: Joseph Davis, Vernon; Richard T. White, West Hartford, both of Conn.

[73] Assignee: United Technologies Corporation, Hartford, Conn.

[21] Appl. No.: 334,491

[22] Filed: Dec. 28, 1981

[51] Int. Cl.³ ............................................. F16C 27/04
[52] U.S. Cl. ................................................. 308/184 R
[58] Field of Search ............ 308/184 A, 184 R, 189 R, 308/189 A, 207 R, 207 A; 384/215, 202, 428, 99, 438; 415/170 R, 111, 112, 113

[56] References Cited

U.S. PATENT DOCUMENTS

| | | | |
|---|---|---|---|
| 3,357,757 | 12/1967 | Morley et al. | 308/184 R |
| 4,046,430 | 9/1977 | Buono et al. | 308/184 R |
| 4,084,861 | 4/1978 | Greenberg et al. | 308/184 R |
| 4,214,796 | 7/1980 | Monzel et al. | 308/184 R X |
| 4,353,604 | 10/1982 | Dulberger et al. | 308/184 R X |

Primary Examiner—John M. Jillions
Assistant Examiner—David J. Werner
Attorney, Agent, or Firm—Charles A. Warren

[57] ABSTRACT

A bearing support structure in which the outer bearing race is in a support ring surrounded by an outer damper ring to form an oil damper space therebetween. At one end of the support ring is a projecting flange to which one end of each of a ring of rods is secured. This ring of rods surrounds the outer damper ring and is secured at the other end of the rods to the remote end of the outer damper ring. The inner end of the damper ring is supported from a mounting flange by a frusto-conical member having holes therethrough for the rods.

4 Claims, 2 Drawing Figures

BEARING SUPPORT STRUCTURE

DESCRIPTION

TECHNICAL FIELD

This invention relates to a combined oil damper and mechanical centering structure for a bearing and is of particular interest in gas turbine engine bearings.

BACKGROUND ART

Oil damper structures for bearings have long been in use and mechanical centering structures have been combined with the oil damping structures to operate in parallel for more effective damping. In installations where there is a high thermal gradient in the bearing and the surrounding support structure the thermally created changes in dimension may affect the dampers as, for example, in distorting the members to cause a nonuniform oil film for oil damping. It is desired to produce a damping structure for the bearing which will maintain a uniform thickness of oil film for effective damping.

DISCLOSURE OF INVENTION

One feature of the invention is a mechanical centering structure in the form of a cage so arranged as to permit the necessary deflection for effective damping and also to maintain the desired uniform film thickness in the associated oil damper.

Another feature is a plurality of rods arranged in a ring and interconnecting the outer bearing race support at one end to the outer element of the oil damper at the other end.

Another feature is a frustoconical member through which the rods extend and which serves to support the outer element of the oil damper.

According to the invention the outer bearing race is carried by a bearing support ring to one end of which is secured a row of axially extending rods forming a cage. This bearing support ring carries the inner element of an oil damper structure and the outer ring is supported by an annulus having a frustoconical end section and a mounting flange at its outer periphery. The rods extend through the midsection of the frustoconical element and engage the outer damper ring at the end remote from its connection to the support annulus.

The foregoing and other objects, features and advantages of the present invention will become more apparent in the light of the following detailed description of the preferred embodiments thereof as shown in the accompanying drawing.

BEST MODE FOR CARRYING OUT THE INVENTION

Figure 1:
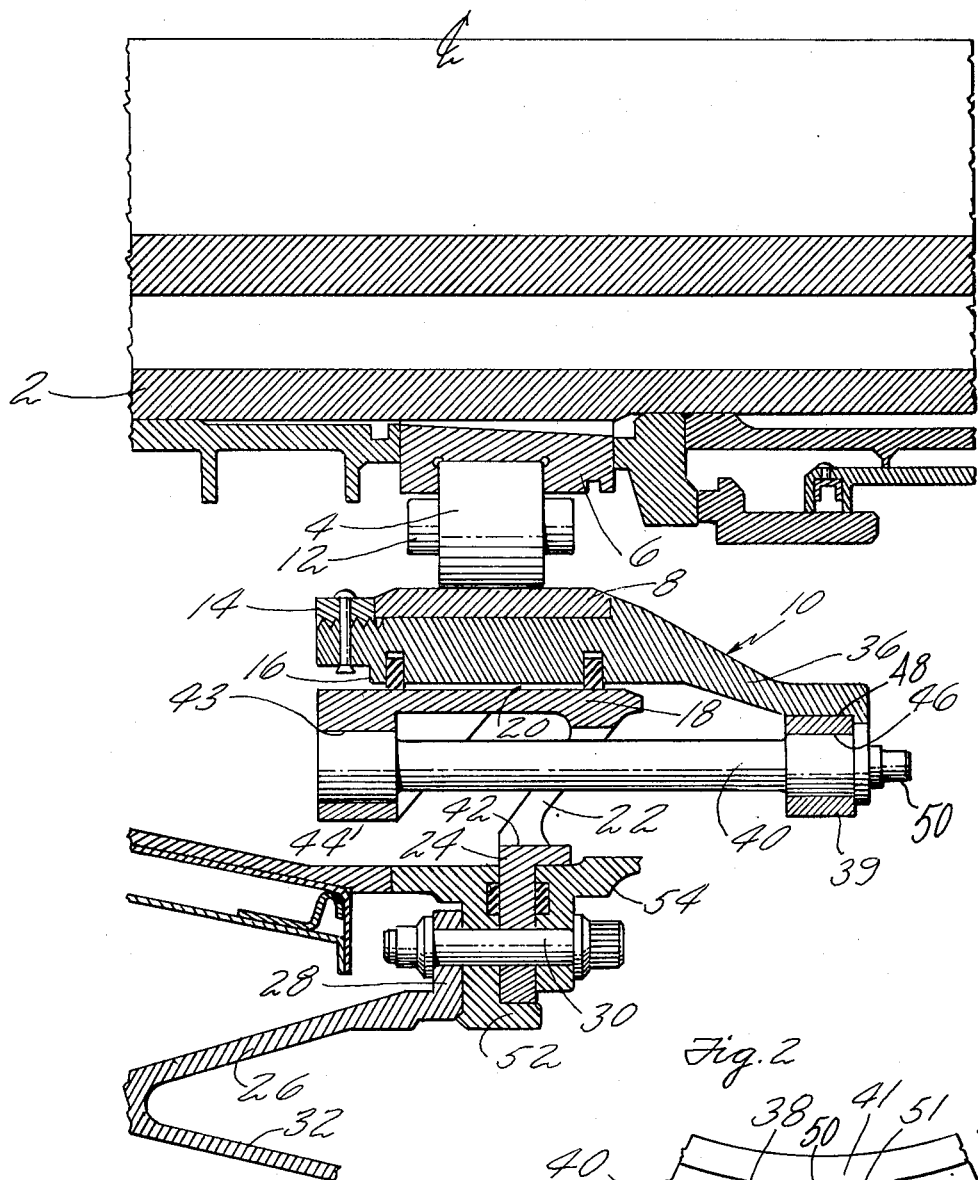
FIG. 1 is a sectional view through a bearing support structure involving the invention.

The shaft 2 is supported by a roller bearing 4 having an inner race 6 mounted on the shaft and an outer race 8 in the race supporting ring 10. Rollers 12 are located between the inner and outer races. The outer race may be held in position in the ring 10 by a locating ring 14 secured to the supporting ring.

The outer surface of the supporting ring 10 has spaced ring seals 16 engaging with the surrounding outer damper ring 18 and defining therebetween an annular space 20 for damping purposes. Suitable means, not shown, provide a constant supply of oil under pressure to this space as will be apparent.

The outer damper ring 18 is integral with a frustoconical element 22 at one end thereof and this element carries at its outer end a mounting flange 24 for attachment to the supporting structure for the bearing assembly. This structure 26 may include a mounting flange 28 to which the flange 24 is bolted as by bolts 30 and the structure 26 also has a web 32 for attachment to a stationary part of the gas turbine powerplant. This bearing assembly is located radially inward of the burner structure of the powerplant (not shown) and thus the temperature at the flanges 24 and 28 is significantly higher than that of the bearing itself and the support structure is thus subjected to significant thermal stresses. The frustoconical element allows thermal changes in dimension in a radial direction without affecting the concentricity of the bearing within the surrounding fixed support structure.

Figure 2:
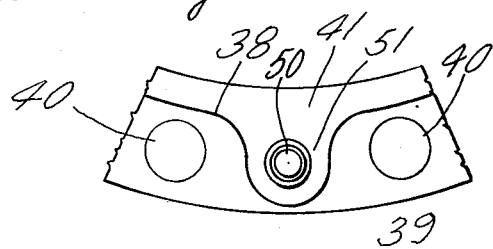
FIG. 2 is a side view of a detail.

The race supporting ring 10 has an annular extension 36 thereon and this extension has a radial flange 38 to support a ring 39. This ring receives a row of rods 40 extending axially and in surrounding relation to the bearing. These rods extend through openings 42 in the element 22 and the ends of the rods remote from the flange 38 are received in axial openings 43 in a flange 44 on the end of the damper ring 18 remote from the attachment to the frustoconical member. The rods are brazed in these openings 43 which are relatively long to assure a secure attachment. At the other end, the rod ends fit in openings 46 in the ring 39 and are brazed therein. The ring 39 fits tightly on a cylindrical surface 48 on the flange 36 and is held against the flange 38 by bolts 50, FIG. 2 extending through the flange 38 and into the ring 39 at points circumferentially spaced from the ends of the rods 40. For weight considerations the flange 38 may consist essentially of several circumferentially spaced tabs 51 one for each bolt 50 as shown in FIG. 2.

With this arrangement the rods routinely hold the end of the ring 18 to which they are attached in a position concentric with the frustoconical element so that the oil film is a uniform thickness from end to end. The rods allow the necessary movement between the damping elements 10 and 18 for effective damping and serve to permit greater movement of the inner damping element if greater than normal shaft vibration occurs. Obviously, the mechanical spring rate may be varied over a large range by changing the length, diameter and number of the rods as well as the material of the rods.

The bolts 30 also clamp additional flanges 52 and 54 which serve to support housing walls, now shown, for the bearing structure. As these walls are not a part of the invention they need not be described.

Although the invention has been shown and described with respect to a preferred embodiment thereof, it should be understood by those skilled in the art that other various changes and omissions in the form and detail thereof may be made therein without departing from the spirit and the scope of the invention.

We claim:

1. In a bearing structure:
   a fixed support structure;
   a shaft;
   a bearing for the shaft having an outer race;

a supporting sleeve for the outer race having an outwardly extending flange thereon;

an outer damper sleeve surrounding said supporting sleeve and being spaced therefrom to provide an oil damping film;

a frustoconical element extending outward from the end of said outer sleeve adjacent the flange on the supporting sleeve, said element also having a flange at its outer end for attachment to the fixed support structure;

a plurality of parallel rods arranged in a ring around the outer sleeve;

an end flange on the end of said outer sleeve remote from the frustoconical member and remote from the flange on the supporting sleeve; and said rods being secured at one end to said end flange and at the other end to the flange on said supporting sleeve, said frustoconical element having openings through which the rods extend, with the flange on the element outside the plurality of rods.

2. A structure as in claim 1 in which said rods are secured by brazing to said supporting sleeve flange and in the end flange on the outer sleeve.

3. A structure as in claim 1 in which the race supporting sleeve has spaced seals on its outer surface to define the oil damping space.

4. A structure as in claim 1 in which the rods are all parallel to the axis of the shaft and uniformly spaced therefrom.

* * * * *